United States Patent [19]

Marco

[11] Patent Number: 5,624,286
[45] Date of Patent: Apr. 29, 1997

[54] TRANSVERSAL CONNECTOR FOR ELECTRIC WIRE AND CABLE APPLICATIONS

[75] Inventor: Antonio M. Marco, Sao Paulo, Brazil

[73] Assignee: The Whitaker Corporation, Wilmington, Del.

[21] Appl. No.: 491,836

[22] PCT Filed: Nov. 16, 1994

[86] PCT No.: PCT/BR94/00038

§ 371 Date: Aug. 18, 1995

§ 102(e) Date: Aug. 18, 1995

[87] PCT Pub. No.: WO95/14313

PCT Pub. Date: May 26, 1995

[51] Int. Cl.$^6$ .................................................. H01R 4/48
[52] U.S. Cl. .................................... 439/786; 439/864
[58] Field of Search ............................... 439/864, 786, 439/877, 879, 439, 440, 441

[56] References Cited

U.S. PATENT DOCUMENTS

| | | | |
|---|---|---|---|
| 3,290,746 | 12/1966 | Broske | 24/126 |
| 3,309,645 | 3/1967 | Noschese | 439/864 X |
| 3,999,829 | 12/1976 | Glaesel | 439/864 X |
| 4,372,637 | 2/1983 | Lane et al. | 439/786 X |
| 4,533,205 | 8/1985 | Frank . | |
| 4,563,054 | 1/1986 | Wilmes | 439/864 X |
| 4,723,920 | 2/1988 | Werner | 439/782 |
| 4,723,921 | 2/1988 | Pooley | 439/783 |
| 4,734,062 | 3/1988 | Goto | 439/783 |
| 4,872,856 | 10/1989 | Pooley et al. | 439/783 |
| 5,152,701 | 10/1992 | Polidori | 439/791 |

*Primary Examiner*—P. Austin Bradley
*Assistant Examiner*—Daniel Wittels

[57] ABSTRACT

An electrical connector with a "U" shape, having its upper wings (8) folded downwards, and provided with grooves (17) in its lower inner part (11), having a plurality of transpassing holes (9) which are coplanar with holes (9) provided in wings (8) and the internal body (21) is capable of housing in holes (9) a conductor (3) that intersects the holes (9) and comes to rest on latch (7) and (23) through its central slot (10) which, on being intersected by conductor (3), is ready to receive conductor (4), that is housed in the lower part (11) where it lays itself over retaining grooves (17). In this manner when the wedge (18) with grooves (19) is pressed downwards, it causes a rotational movement around the conductor (3) causing the eccentric part (12) to position itself between the conductor (4) and the slot (10) that compresses the conductors against the connector (A). The lower convex part of the eccentric part (12) is provided with grooves (16) that ensure the latching and the electrical contact of conductors (3) and (4) with the connector (A). The latch (23) actuates over the conductors in the same manner, but obtains through the movement of the lever exerted by the pliers (24) during its application over the wings (25) a force or pressure several times larger than the force of latch (7), and is recommended for connections of cables that demand a contact pressure and a spring effect with high and constant force.

18 Claims, 6 Drawing Sheets

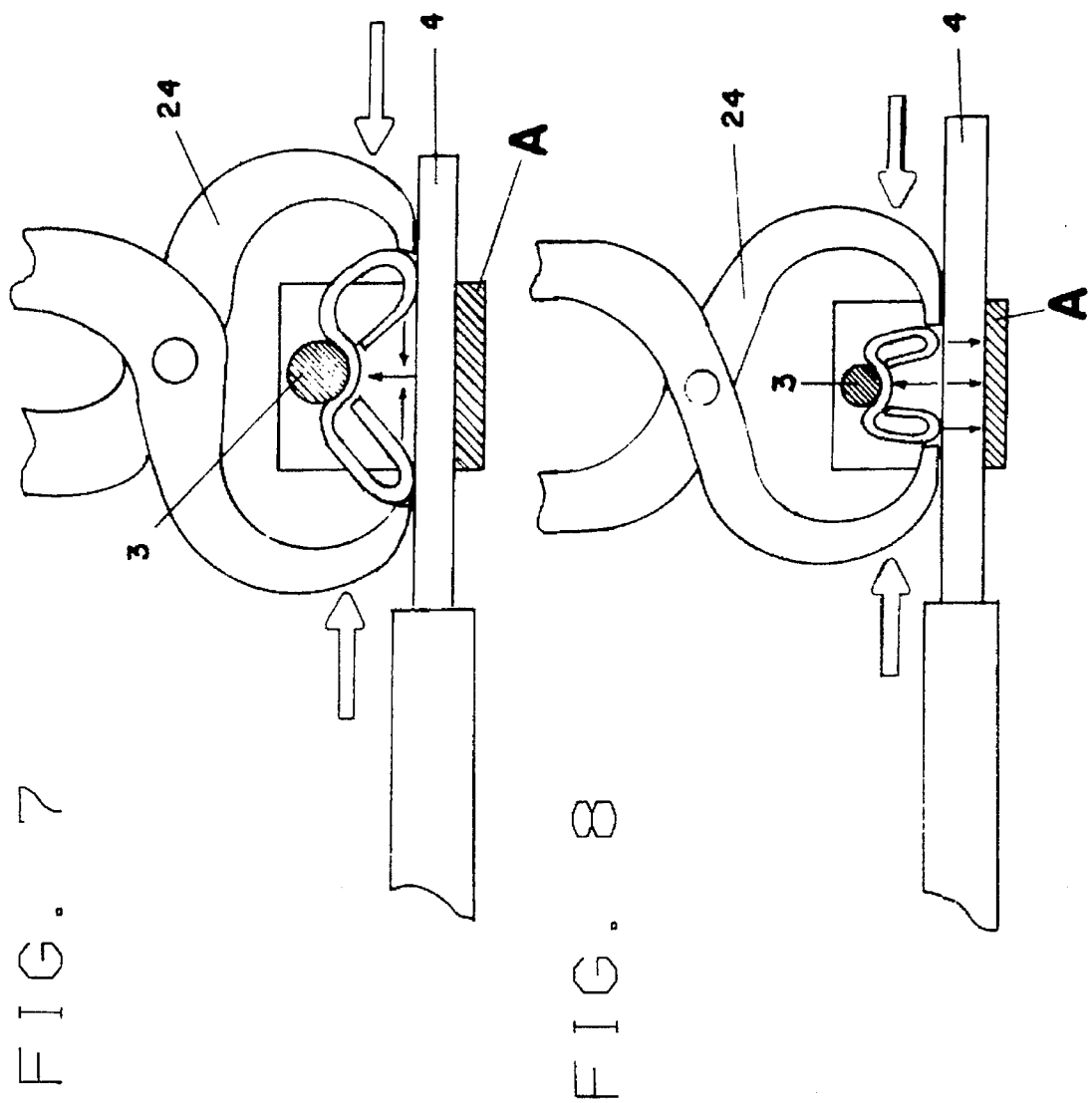

TRANSVERSAL CONNECTOR FOR ELECTRIC WIRE AND CABLE APPLICATIONS

The present invention refers itself to a connector made from a material, preferably a good electric conductor, like copper, aluminum or brass, that has as objective to join two wires or conductors, to permit electrical current conductivity by between them.

The present connector is made from a stamped sheet or foil (on extruded) in a "U" form with upper wings folded downwards, so as to bend and ensure a better electrical contact in addition to strengthening its structure.

Along its wings there are transversal transpassing holes placed in such a way that one of the conductors can cross perpendicularly the connector. These holes also have the purpose of housing different diameters of wires or conductors, enabling the use of the same connector for several wire combinations so that there is always an equidistant center between the conductors. This enables a contact force or pressure between them.

In the central portion of the "U" shaped connector and perpendicularly to the holes two types of cable latches can be introduced one being applied manually and the other with pliers.

The first type has the shape of a ratchet lock (wedge) and has an eccentric part whose purpose is to exert pressure between the conductors, moving and compressing them against the connector. Owing to the slight progression curve this can be done manually.

The second type has the shape of a gull's wing, and differs by being applied by a tool that causes it to lift, exerting the same contact force and pressure.

This type of connection is fast, cheap and safe owing to the fact that the connector is made of two pares simple to manufacture and it can also be installed and removed several times without causing damage to the connector.

The invention will be described below, as an example with reference to the attached drawings in which.

Figure 5:
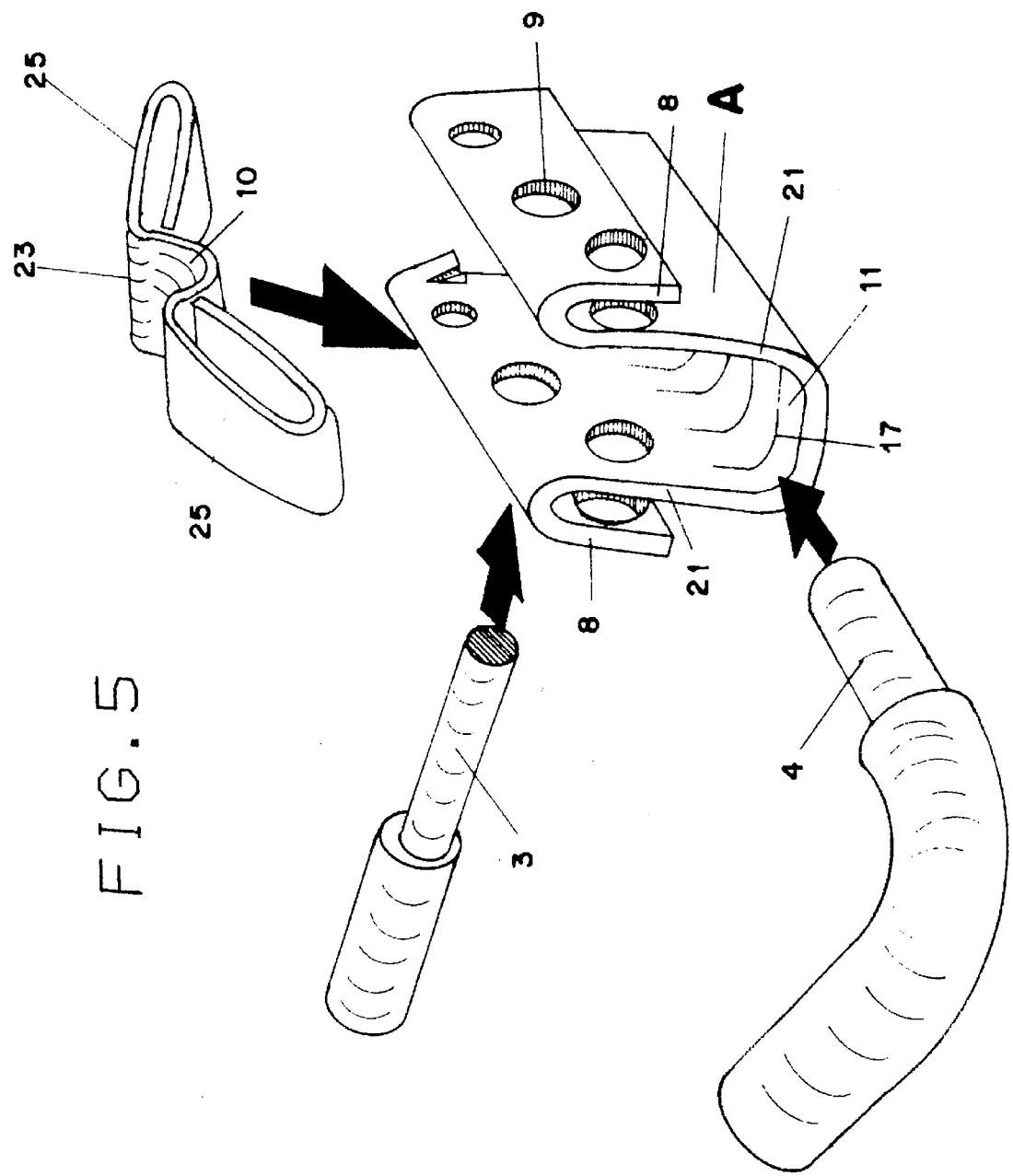

FIG. 5 in an exploded view of a connector type Transversal Connector for Electric Wire and Cable Applications showing the gull's wing shape latch of the alternative embodiment before assembly.

Figure 6:
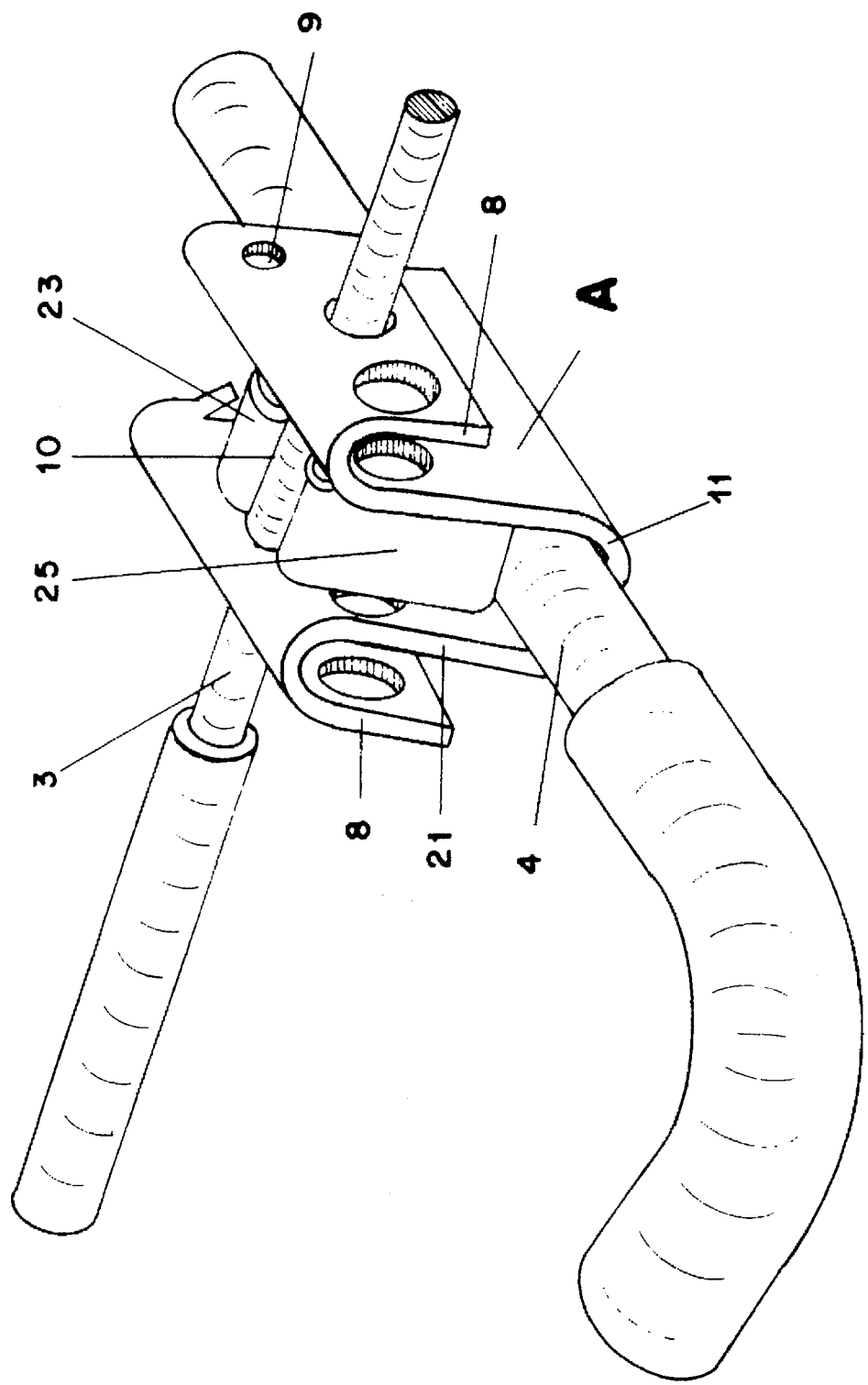

FIG. 6 is a view of the connector of FIG. 5 assembled connecting a small diameter drop conductor to a large diameter main power conductor.

FIG. 7 is a cross section view of the connector, showing the latch of the alternative embodiment before being actuated.

FIG. 8 is a cross view of the connector, showing the latch of the alternative embodiment after being compressed by a pair of pliers.

DETAILED DESCRIPTION OF THE INVENTION

As can be seen from the Figures of the drawings the transversal connector appropriate for electric wire and cable applications is formed of at least two parts, namely, the connector body A; the latch 7 of the preferred embodiment and the latch 23 of the alternative embodiment.

Figure 1:
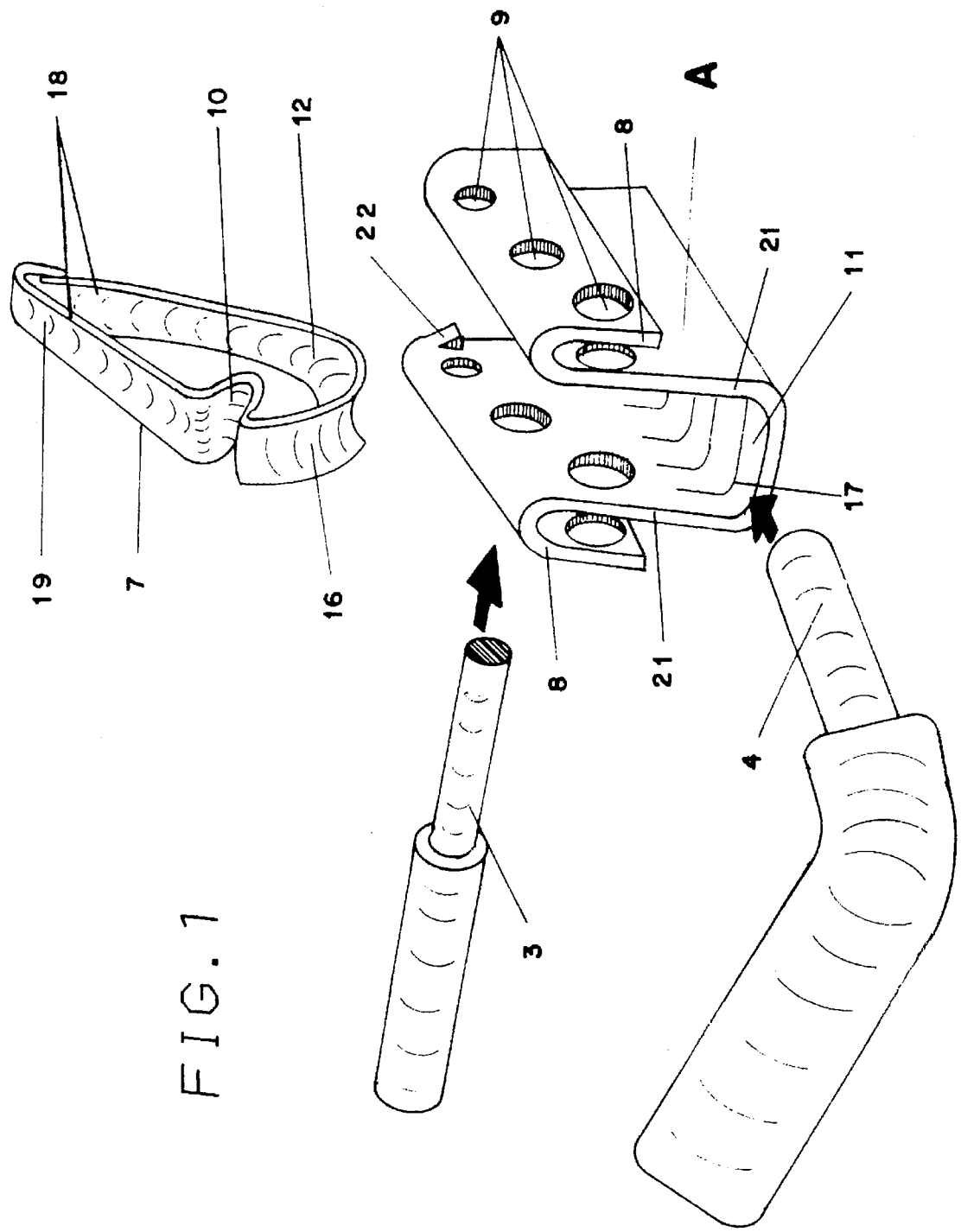
FIG. 1 is an exploded view of an electric connector of the type Transversal Connector for Electric Wire and Cable Applications, assembled with the eccentric latch according to the preferred embodiment of the invention.
Figure 2:
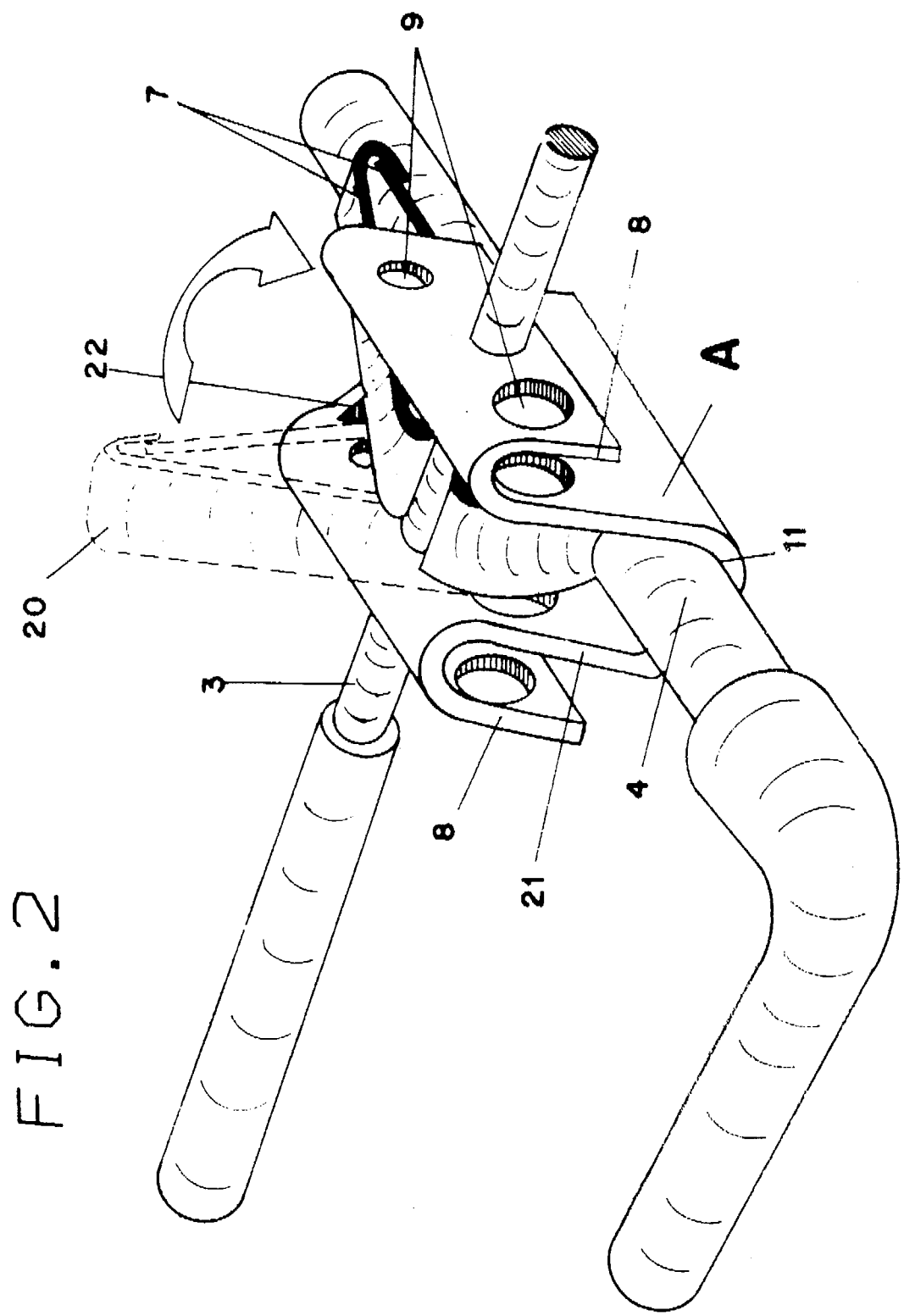
FIG. 2 is an assembled view of the connector of FIG. 1, connecting a small diameter drop conductor with a large diameter main power conductor.

The body of the connector A as illustrated in FIG. 1 has generally a "U" shape with two upper wings 8 folded downwards which are provided with a plurality of transpassing holes coplanar with a plurality of holes 9 provided in each side of the connector which face the wings 8. The holes 9 house a conductor 3 which depending on the diameter can cross one of these transpassing holes of the connector perpendicularly to the section of the connector's wings and body A as illustrated in FIG. 2. The inner lower part of the "U" shaped connector is provided with grooves that serve to improve the adherence and avoid the sliding of the conductor 4.

In the preferred embodiment the latch 7 has a central slot 10 that should also be intersected by the conductor 3 as is depicted in FIGS. 1 and 2 and in addition it has a wedge 18 at one of its extremities. In the lower part of the latch 7, there is a convex region 16. Latch 7 is provided with grooves which have the function of increasing the adherence and the latching of the conductor 4 when latched, to ensure that, the conductor 4 will not slide when under traction. In addition they ensure the contact and the latching. The convex region 16 exerts an important role in the spring effect, ensuring the spring course and the contact force or pressure.

In FIG. 2 we can see the conductor 3 intersecting the body of the connector A and the latch 7 in the locked position. A dotted detail 20 is also shown whose purpose is to show the locked position before being actuated. We can see the conductor 4 housed in the lower internal region of the "U" of the connector A body.

Figure 3:
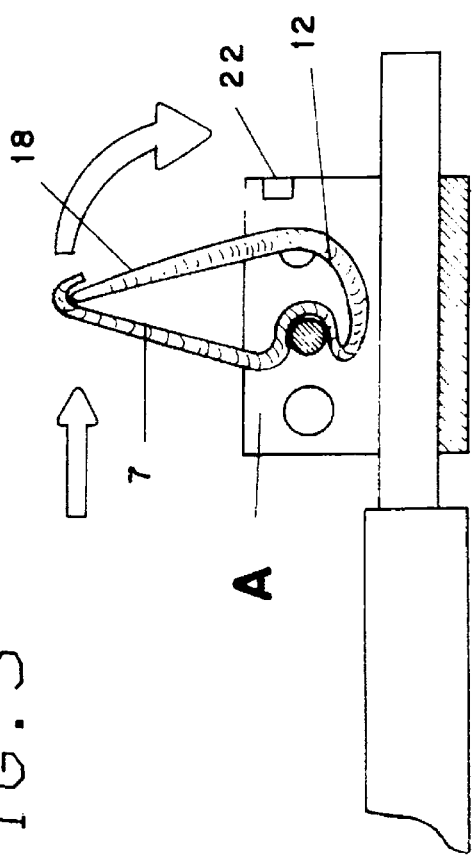
FIG. 3 is a cross section view of the connector showing the latch before being actuated.
Figure 4:
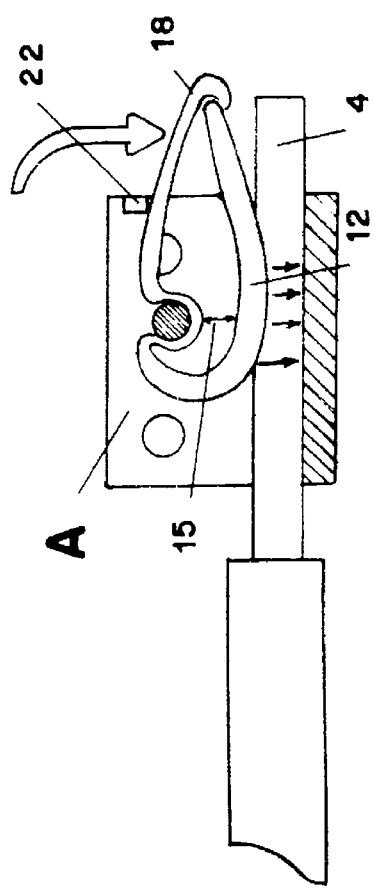
FIG. 4 is a cross section view of the connector showing the latch after being actuated.

FIGS. 3 and 4 illustrate in detail the functioning of the tension between the cables and the connector when the latch 7 is actuated or not. FIG. 3 depicts the latch 7 with an eccentric part 12 thereon in a resting position.

In FIG. 4 subsequently to being rotated the latch 7 is compressed downwards. In this way the eccentric part 12 exerts a imaginary force line 15 as shown by the arrow. This way the conductor 4 is pressed downwards against the lower internal region in the connector's body A. The latch 7 in turn tends to go upwards resting on the conductor 3, which is housed in the central slot 10 and which intersects the holes 9 of the connector A. An opposite reaction force is created, impelling the conductors 3 and 4 to rest on the connector's body A ensuring the locking and electrical connection.

In FIG. 4 we depicts a projecting slit 22 which is a projection provided in the connector's body A for locking the latch 7. When the actuator arm 18 is depressed it passes through this projection making a "click". This noise advises the installer that the connection has been effected. The slit 22 prevents the latch 7 from returning to the unlocked position.

FIG. 5 illustrates an alternative embodiment or a second type of latch 23 having a central slot 10 that presents a gull's wing shape with at least two wings 25 folded inwards. This latch also supports the conductor 3 when applied.

The shape of the latch 23 has an important result in the contact pressure, and may be applied in connections that require a high contact pressure with spring action.

The latch 23 is made of a stamped sheet, having a shape of a gull's wing folded inwards as shown in FIG. 7. During the application the latch 23 deforms causing the wings 25, that initially are bent downwards to be bent inwards, and causes its central slot 10 to rise and to rest on the conductor 3 which crosses the connector A. In this way the wings 25 rest on conductor 4 creating a support and contact pressure between conductors 3 and 4 and the latch 23 with the connector A, maintaining the assembly in constant pressure, as is shown in FIG. 8.

The spring effect is very important in this type of connector and is exerted by the wings and its curve radius when applied and latched the radius are altered to absorb the excessive length of the wings, and this way the wings are permanently under structural stress, absorbing the variations in distances between the conductors caused by the variation in temperature of the ambient or caused by short circuits in the power networks that result in heating of the connections.

I claim:

1. Transversal connector for Wire and Cable Applications, comprising: a body consisting of electrically conductive material which has a generally "U" shaped form, with at least two lateral wings folded downward, the wings being provided with a plurality of holes coplanar with identical holes provided in the body, adjacent to the wings; the body having a lower part provided with a plurality of grooves in the inner part of the body adjacent to the holes, a projecting slit is also provided, the connector having a latch consisting of the same material of the body, the latch having a central slot, at least two actuating arms and a convex part in the lower part adjacent to the central slot and an eccentric part adjacent to the convex part, the latch being totally provided with a plurality of grooves.

2. Transversal connector, according to claim 1, wherein conductors, are assembled in the connector perpendicularly and spaced apart one from the other, the conductor intersecting the holes and the conductor being supported in the lower part of the connector so that the conductor may rest on the latch enabling its rotation and causing the eccentric part to exert a force between the conductor and the lower part of the connector body resulting in a supporting reacting force between the conductors and the connector.

3. Transversal connector, according to claim 1, wherein the eccentric part of the latch, on rotating, moves its rotating center resulting in a force that keeps first and second conductors apart and providing pressure against the connector body, the convex part in the lower part together with the eccentric part, enable more adherence between the latch and one of the conductors thus preventing the conductor from loosening and ensuring contact and latching.

4. Transversal connector, according to claim 1, wherein the connector is made from stamped sheet or extruded sheet and in the space between the wing and the body can be filled to enhance the contact area between the wing and the conductor.

5. Transversal connector for wire and cable applications, comprising a body consisting of electrically conductive material which has a generally "U" shaped form with at least two lateral wings folded downwards, the wings being provided with a plurality of holes coplanar with identical holes provided in the body adjacent the wings, the body having a lower part provided with a plurality of grooves in the inner part of the body adjacent to the holes, a projecting slot is also provided, the connector having a latch whose extremities form at least two wings folded inwardly with a central slot appropriate for receiving a conductor, the wings are capable of moving through locking pressure, thereby compressing a conductor supported in the lower part of the body and pressuring the conductor away from the other.

6. Transversal connector, according to claim 5, wherein the latch has the shape of a gull's wings, whose edges are folded inwards, forming at least two lateral wings and a central slot.

7. Transversal connector, according to claim 5, that the central slot is provided with a plurality of grooves in the concave part and allows a better contact with the conductor which rests thereon.

8. Transversal connector, according to claim 1, wherein the latch is made from plastic material, metallic material or from any conductive material, improving the electrical current conductivity between the conductors.

9. Transversal connector, according to claim 1, wherein the connector and latch is made in several sizes and different scales.

10. An electrical connector comprising:
   (a) an electrically conductive body member having a conductor receiving recess thereof for receiving a first conductor therethrough, and a lower part for receiving a second conductor therein;
   (b) an electrically conductive latch having a first surface for receiving said first conductor, a spring member comprising a second surface for receiving said second conductor, and an actuating section for generally rotating said latch relative to said body;
   (c) upon said rotation of said actuating section, said second surface is pushed against said second conductor, storing spring energy in said spring member, and said spring member thereby provides contact normal forces between said first and second conductors, said body, and said latch for electrical contact therebetween.

11. The electrical connector of claim 10, wherein said lower part comprises a trough for receiving said second conductor therein.

12. The electrical connector of claim 10, wherein said second surface comprises a generally eccentric arc.

13. An electrical connector comprising:
   (a) an electrically conductive body member having a conductor receiving recess therein for receiving a first conductor, and a lower part for receiving a second conductor therein;
   (b) an electrically conductive latch having a first surface for receiving said first conductor, spring sections adjacent said first surface comprising respective second surfaces for receiving said second conductor, and each spring section comprises an actuating section for displacing said spring sections about said first surface; and
   (c) upon said displacement of said actuating sections, said first and second surfaces are pushed against said first and second conductors, respectively, storing spring energy in said spring sections, said spring sections thereby provide contact normal forces between said first and second conductors, said body, and said latch for electrical contact therebetween.

14. The electrical connector of claim 13, wherein said lower part comprises a trough for receiving said second conductor therein.

15. The electrical connector of claim 13, wherein said spring sections comprise extensions of said first surface.

16. The electrical connector of claim 13, wherein said spring sections comprise respective loop shapes.

17. The electrical connector of claim 16, wherein said loops each comprise a support end, said support ends support said first surface when said spring sections are pushed against said second conductors.

18. The electrical connector of claim 15, wherein said extensions are pressed toward each other for creating said contact normal forces.

* * * * *